United States Patent
Dingli (10) Patent No.: US 10,798,528 B1
(45) Date of Patent: Oct. 6, 2020

(54) MOBILE DEVICE LOCATION MONITORING

(71) Applicant: Pony AI Inc., Grand Cayman (KY)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/355,561

(22) Filed: Mar. 15, 2019

(51) Int. Cl.
| | | |
|---|---|---|
| *G06K 9/00* | (2006.01) | |
| *G05D 1/00* | (2006.01) | |
| *G08B 21/24* | (2006.01) | |
| *H04W 4/029* | (2018.01) | |
| *G08B 21/02* | (2006.01) | |
| *B60N 2/00* | (2006.01) | |
| *G08B 21/22* | (2006.01) | |

(52) U.S. Cl.
CPC ............ *H04W 4/029* (2018.02); *B60N 2/002* (2013.01); *G05D 1/0088* (2013.01); *G06K 9/00832* (2013.01); *G08B 21/0247* (2013.01); *G08B 21/22* (2013.01); *G08B 21/24* (2013.01)

(58) Field of Classification Search
CPC .. G01S 5/0252; G01S 5/0263; G06F 16/9537; H04L 61/6022; H04L 67/18; H04L 67/306; H04W 4/021; H04W 4/023; H04W 4/025; H04W 4/029; H04W 64/003; H04W 84/12; H04W 88/02; H04W 8/005; H04W 4/44; H04W 4/48; H04W 4/90; H04W 4/02; B60K 28/04; B60W 10/06; B60W 10/182; B60W 10/30; B60W 2510/244; B60W 2710/188; B60W 2710/30; B60W 30/18054; F16H 2059/746; F16H 59/50; F16H 61/0202; F16H 63/48; G05D 1/0088; G05D 2201/0213; G06K 9/00832; G06K 9/00838; G06K 9/00288; G06K 9/00993; G06Q 10/06; G06Q 50/30; G08B 13/19602; G08B 21/24; G08B 3/10; G08B 5/36; H04M 1/72538; H04M 1/72566; H04M 1/72569; H04M 1/72572; G08G 1/0112; G08G 1/0129; G08G 1/0133; G08G 1/0141; G08G 1/0967; G08G 1/096741; G08G 1/096775
See application file for complete search history.

(56) References Cited

U.S. PATENT DOCUMENTS

| | | | |
|---|---|---|---|
| 9,031,583 B2 | 5/2015 | Pereira et al. | |
| 9,392,406 B2 | 7/2016 | Houri | |
| 2014/0277935 A1* | 9/2014 | Daman | B60N 2/28 701/36 |
| 2017/0220829 A1* | 8/2017 | Argentieri | G06Q 10/06 |
| 2018/0148057 A1* | 5/2018 | Khafagy | F16H 59/50 |
| 2019/0197325 A1* | 6/2019 | Reiley | G06Q 10/06 |
| 2019/0260868 A1* | 8/2019 | Graham | H04W 4/029 |
| 2019/0286148 A1* | 9/2019 | Hase | G05D 1/0246 |

* cited by examiner

*Primary Examiner* — Dionne Pendleton (74) *Attorney, Agent, or Firm* — Sheppard Mullin Richter & Hampton LLP (57) ABSTRACT

Systems, methods, and non-transitory computer readable media may be configured to facilitate monitoring location of a mobile device. A relative location of a mobile device of a passenger to a vehicle may be monitored. Whether a location of the mobile device is coincident with a location of the vehicle may be determined based on the relative location of the mobile device to the vehicle. An alert may be generated responsive to a determination that the location of the mobile device is coincident with the location of the vehicle.

20 Claims, 6 Drawing Sheets

MOBILE DEVICE LOCATION MONITORING

FIELD OF THE INVENTION

This disclosure relates to approaches for monitoring location of a mobile device with respect to a vehicle.

BACKGROUND

Persons getting out of vehicles may leave mobile devices in the vehicle (e.g., in the cabin, in the trunk). It may be difficult and time-consuming for the passengers to locate their mobile devices.

SUMMARY

Various embodiments of the present disclosure may include systems, methods, and non-transitory computer readable media configured to facilitate monitoring location of a mobile device. A relative location of a mobile device of a passenger to a vehicle may be monitored. Whether a location of the mobile device is coincident with a location of the vehicle may be determined based on the relative location of the mobile device to the vehicle. An alert may be generated responsive to a determination that the location of the mobile device is coincident with the location of the vehicle.

In some embodiments, monitoring the relative location of the mobile device to the vehicle may include: obtaining mobile device location information, the mobile device location information characterizing the location of the mobile device; obtaining vehicle location information, the vehicle location information characterizing the location of the vehicle; and determining the relative location of the mobile device to the vehicle based on the location of the mobile device and the location of the vehicle. The mobile device location information may be generated based on operation of a location sensor of the mobile device, and the vehicle location information may be generated based on operation of a location sensor of the vehicle.

In some embodiments, determining whether the location of the mobile device is coincident with the location of the vehicle may include determining whether the location of the vehicle at a time moment overlaps with the location of the mobile device at the time moment. The time moment may include a point in time or a duration of time.

The time moment may occur after the passenger has completed a trip in the vehicle. For example, the time moment may occur subsequent to passage of a period of time after the passenger has completed the trip in the vehicle. The time moment may occur subsequent to movement of the vehicle after the passenger has completed the trip in the vehicle. For instance, the time moment may occur within one minute after the passenger has left the vehicle or after the vehicle has resumed movement after the passenger has left the vehicle.

In some embodiments, a determination may be made as to whether the passenger has left the vehicle. For example, the determination that the passenger has left the vehicle may include a determining a reduction of a total weight of the vehicle, detecting opening and closing of a door of the vehicle, and/or optical sensing of movement of the passenger out of the vehicle.

In some embodiments, determining whether the location of the mobile device is coincident with the location of the vehicle may include determining whether movement of the mobile device at a time moment is coincident with movement of the vehicle at the time moment.

In some embodiments, monitoring the relative location of the mobile device to the vehicle may include: obtaining mobile device signal information, the mobile device signal information characterizing first signal strength of a first signal received by the vehicle from the mobile device or second signal strength of a second signal received by the mobile device from the vehicle; and determining the relative location of the mobile device to the vehicle based on the first signal strength or the second signal strength.

In some embodiments, monitoring the relative location of the mobile device to the vehicle may include: determining whether the mobile device is communicatively coupled to the vehicle; and determining the relative location of the mobile device to the vehicle based on the communicative coupling between the mobile device and the vehicle.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In various implementations, a relative location of a mobile device of a passenger to a vehicle may be monitored. Whether a location of the mobile device is coincident with a location of the vehicle (e.g., in the same location, overlapping with vehicle location, occupying same point/area) may be determined based on the relative location of the mobile device to the vehicle. An alert may be generated responsive to a determination that the location of the mobile device is coincident with the location of the vehicle.

The relative location of the mobile device to the vehicle may be monitored by using location information of the mobile device and the vehicle. For example, mobile device location information (e.g., generated based on operation of a location sensor of the mobile device) may characterize the location of the mobile device and vehicle location information (e.g., generated based on operation of a location sensor of the vehicle) may characterize the location of the vehicle. The mobile device location information and the vehicle location information may be obtained, and the relative location of the mobile device to the vehicle may be determined based on the location of the mobile device (as characterized by the mobile device location information) and the location of the vehicle (as characterized by the mobile device location information).

The relative location of the mobile device to the vehicle may be monitored by using one or more signals communicated between the mobile device and the vehicle. For example, mobile device signal information may characterize signal strength of a signal received by the vehicle from the mobile device or signal strength of a signal received by the mobile device from the vehicle. The mobile device signal information may be obtained, and the relative location of the mobile device to the vehicle may be determined based on the signal strength of the signal received by the vehicle from the mobile device or the signal strength of the signal received by the mobile device from the vehicle.

The relative location of the mobile device to the vehicle may be monitored by using communicative coupling between the mobile device and the vehicle. For example, whether the mobile device is communicatively coupled to the vehicle may be determined, and the relative location of the mobile device to the vehicle may be determined based on the communicative coupling between the mobile device and the vehicle.

Whether the location of the mobile device is coincident with the location of the vehicle may be determined based on locations and/or movements of the vehicle and the mobile device at a time moment. For example, determining whether the location of the mobile device is coincident with the location of the vehicle may include determining whether the location of the vehicle at a time moment overlaps with the location of the mobile device at the time moment. As another example, determining whether the location of the mobile device is coincident with the location of the vehicle may include determining whether movement of the mobile device at a time moment is coincident with movement of the vehicle at the time moment.

The time moment may include one or more points in time or one or more durations of time. The time moment may occur after the passenger has completed a trip in the vehicle. For example, the time moment may occur: (1) subsequent to passage of a period of time after the passenger has completed the trip in the vehicle, and/or (2) subsequent to movement of the vehicle after the passenger has completed the trip in the vehicle. For instance, the time moment may occur within one minute after the passenger has left the vehicle and/or after the vehicle has resumed movement after the passenger has left the vehicle. A determination may be made as to whether the passenger has left the vehicle. For example, the determination that the passenger has left the vehicle may include a determining a reduction of a total weight of the vehicle (e.g., by a threshold amount), detecting opening and closing of a door (e.g., door accessible to the passenger) of the vehicle, and/or optical sensing of movement of the passenger out of the vehicle (e.g., using image(s)/video(s) of the passenger leaving the vehicle).

The approaches disclosed herein provides for monitoring location of a mobile device. When a passenger leaves a vehicle, the passenger may leave a mobile device in the vehicle. The relative location of the mobile device to the vehicle may be monitored to detect instances in which the passenger has left the mobile device in the vehicle. An alert indicating that the mobile device has been left in the vehicle may be generated and provided so that the passenger may retrieve the mobile device.

While the disclosure is described herein with respect to monitoring location of a mobile device of a passenger of a vehicle, this is merely for illustrative purposes and is not meant to be limiting. The approaches disclosed herein may be used to monitor location of a mobile device of other people that uses a vehicle, such as a driver of a vehicle.

Figure 1:
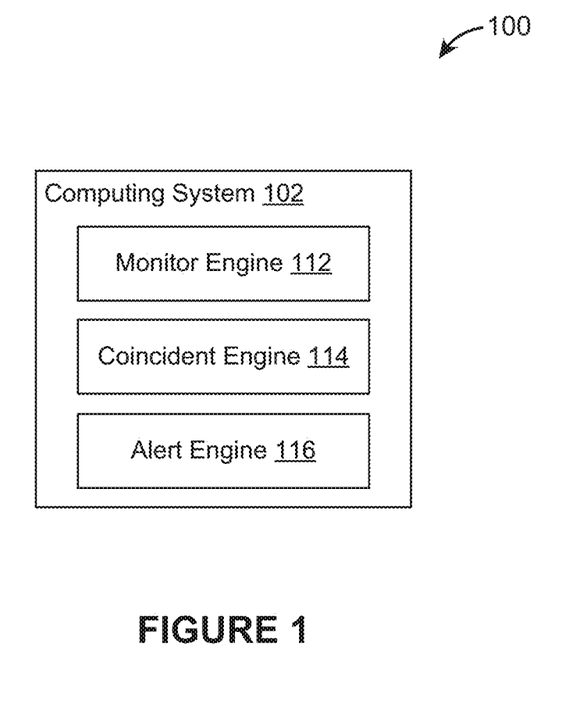
FIG. 1 illustrates an example environment for monitoring location of a mobile device, in accordance with various embodiments.

FIG. 1 illustrates an example environment 100 for monitoring location of a mobile device, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include a monitor engine 112, a coincident engine 114, an alert engine 116, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices. One or more portions of the computing system 102 may be implemented within a vehicle (e.g., autonomous vehicle). One or more portions of the computing system may be implemented remotely from a vehicle (e.g., server).

In various embodiments, the monitor engine 112 may be configured to monitor a relative location of a mobile device of a passenger to a vehicle. A vehicle may refer to a thing used to transport one or more persons and/or one or more things. Examples of vehicle may include an autonomous vehicle, a non-autonomous vehicle, a taxi, a ride-share vehicle, a vehicle owned by an organization, a personally owned vehicle, and/or other vehicles. A passenger may refer to a person riding inside the vehicle and/or a person who has finished riding inside a vehicle, such as a person who has completed a trip in a vehicle. A mobile device may refer to a portable computing device. Examples of mobile device may include a smartphone, a tablet, a smartwatch, a laptop, and/or other mobile devices.

Monitoring the relative location of the mobile device to the vehicle may include observing, determining, and/or checking the relative location of the mobile device to the vehicle. The monitor engine 112 may monitor the relative location of the mobile device to the vehicle at regular intervals, at irregular intervals, at other times, based on a request for information on the relative location of the mobile device to the vehicle, and/or based on other information. For example, the monitor engine 112 may monitor the relative location of the mobile device to the vehicle after the passenger has completed a trip in the vehicle. Such monitoring of the relative location of the mobile device to the vehicle may enable the computing system 102 to determine whether the passenger has left the mobile device in the vehicle (e.g., left the mobile in the cabin or the trunk when leaving the vehicle).

A relative location of a mobile device of a passenger to a vehicle may refer to a location of the mobile device defined in terms of a location of the vehicle, or vice versa. For example, a relative location of a mobile device to a vehicle may refer to a particular position (e.g., on a map) of the mobile device in reference to the position (e.g., on the map) of the vehicle. The monitor engine 112 may monitor a relative location of a mobile device to a vehicle by using distance between the mobile device and the vehicle and/or the direction from the mobile device to the vehicle (or vice versa). The monitor engine 112 may monitor a relative location of a mobile device to a vehicle by using strength of one or more signals communicated between the mobile device and the vehicle. The monitor engine 112 may monitor a relative location of a mobile device to a vehicle by using status of communicative coupling between the mobile device and the vehicle. Other ways to monitor the relative location of a mobile device to a vehicle are contemplated.

The monitor engine 112 may monitor a relative location of a mobile device to a vehicle by using location information of the mobile device and location information of the vehicle. Location information of a device may refer to information that characterizes the location of the device. Location information of a device be generated based on operation of one or more location sensors, such as a GPS sensor of the device. For example, mobile device location information may be generated based on operation of a location sensor of the mobile device and vehicle location information may be generated based on operation of a location sensor of the vehicle. Mobile device location information may characterize the location of the mobile device and vehicle location information may characterize the location of the vehicle. The monitor engine 112 may obtain the mobile device location information and the vehicle location information (e.g., directly/indirectly from the mobile device/vehicle and/or the location sensor of the mobile/device) and determine the relative location of the mobile device to the vehicle based on the location of the mobile device (as characterized by the mobile device location information) and the location of the vehicle (as characterized by the mobile device location information). For instance, the monitor engine 112 may monitor the latitude and longitude coordinates (GPS locations) of the mobile device and the vehicle based on the mobile device location information and the vehicle location information.

The monitor engine 112 may monitor a relative location of a mobile device to a vehicle by using mobile device signal information. Mobile device signal information may refer to information that characterizes signal strength of one or more signals communicated between the mobile device and the vehicle. A signal communicated between the mobile device and the vehicle may refer to a signal (e.g., electrical impulse, radio wave transmission) transmitted by the mobile device and received by the vehicle, or a signal transmitted by the vehicle and received by the mobile device. Signal strength of a signal may refer to the magnitude or power of the signal at the reception point. For example, mobile device signal information may characterize signal strength of a signal received by the vehicle, with the signal originating from the mobile device. As another example, mobile device signal information may characterize signal strength of a signal received by the mobile device, with the signal originating from the vehicle. The monitor engine 112 may obtain the mobile device signal information (e.g., directly/indirectly from the mobile device/vehicle and/or the signal strength sensor of the mobile/device) and determine the relative location of the mobile device to the vehicle based on the signal strength of the signal received by the vehicle from the mobile device and/or the signal strength of the signal received by the mobile device from the vehicle. For instance, the monitor engine 112 may monitor the magnitude of the signal strength of signal(s) communicated between the mobile device and the vehicle, which may indicate how close or far the mobile device is from the vehicle (e.g., high magnitude indicating the mobile device is within or close to the vehicle, low/zero magnitude indicating the mobile device is outside or far from the vehicle, amount of magnitude indicating approximate distance between the mobile device and the vehicle/signal transmitter of the vehicle).

The monitor engine 112 may monitor a relative location of a mobile device to a vehicle by using status of communicative coupling between the mobile device and the vehicle. Status of communicative coupling between the mobile device and the vehicle may refer to condition of communicative coupling between the mobile device and the vehicle. Communicative coupling between the mobile device and the vehicle may refer to connection made between the mobile device and the vehicle through one or more communication protocols, techniques, and/or technology. For example, status of communicative coupling between the mobile device and the vehicle may indicate whether the mobile device and the vehicle are communicating with each other and/or whether the mobile device and the vehicle are capable of communicating with each other. The monitor engine 112 may determine whether the mobile device is communicatively coupled to the vehicle (e.g., communicating with the vehicle, capable of communicating with the vehicle), and determine the relative location of the mobile device to the vehicle based on the communicative coupling between the mobile device and the vehicle (e.g., whether the mobile device is communicating with the vehicle, capable of communicating with the vehicle). The communicative coupling between the mobile device and the vehicle may indicate how close or far the mobile device is from the vehicle (e.g., the mobile device communicating/capable of communicating with the vehicle indicating the mobile device is within or close to the vehicle, the mobile device not communicating/not capable of communicating with the vehicle indicating the mobile device is outside or far from the vehicle). The type of communication used between the mobile device and the vehicle may be used to determine the relative location of the mobile device to the vehicle. For example, based on the communicative coupling between the mobile device and the vehicle being accomplished through a local communication protocol (e.g., Bluetooth, near-field communication), the mobile device communicating or being capable of communicating with the vehicle may indicate that the mobile device is close to the vehicle (e.g., being within the range of the type of communication used).

In some embodiments, the monitor engine 112 may be configured to determine whether the passenger has left the vehicle. The determination that the passenger has left the vehicle may be determined based on one or more characteristics of the vehicle, one or more observations of the vehicle, and/or one or more observations of the passenger. For example, the monitor engine 112 may monitor the total weight of the vehicle. When the passenger leaves the vehicle, the total weight of the vehicle may be reduced. The monitor engine 112 may determine that the passenger has left the vehicle based on a reduction (e.g., of a certain/threshold amount) of the total weight of the vehicle. As another example, the monitor engine 112 may monitor the usage (e.g., opening, closing) of one or more doors of the vehicle. The monitor engine 112 may determine that the passenger has left the vehicle based on a door (e.g., passenger-side door) opening an closing. The door may need to be opened for a certain/threshold duration of time for the monitor engine 112 to determine that the passenger has left the door. Th use of the door being opened for the certain/threshold duration of time may enable the monitor engine 112 to distinguish between opening and closing of the door for passenger departure versus other reasons, such as opening and closing of the door to clear an object (e.g., seat belt, clothing) that has been caught in the doorway. As yet another example, the monitor engine 112 may monitor the passenger, the cabin of the vehicle, and/or one or more doors of the vehicle using one or more image capture devices. The images and/or videos captured by the image capture device(s) may be analyzed to optically sense movement of the passenger, such as the passenger leaving the vehicle. Based on the optical sensing of the passenger, the cabin, and/or the door(s) of the vehicle, the monitor engine 112 may determine whether the passenger has left the vehicle.

In various embodiments, the coincident engine 114 may be configured to determine whether a location of the mobile device is coincident with a location of the vehicle. Whether the location of the mobile device is coincident with a location of the vehicle may be determined based on the relative location of the mobile device to the vehicle. The location of the mobile device being coincident with the location of the vehicle may include the mobile device and the vehicle being located at the same location at the same time, the mobile device and the vehicle occupying the same point or area (e.g., on a map) at the same time, the location of the mobile device overlapping with the location of the vehicle, and/or the location of the mobile device being otherwise coincident with the location of the vehicle. The location of the mobile device being coincident with the location of the vehicle may indicate that the passenger has left the mobile device in the vehicle.

Determining whether the location of the mobile device is coincident with the location of the vehicle based on the relative location of the mobile device to the vehicle may include determination of whether the location of the mobile device is coincident with the location of the vehicle based locations and/or movements of the vehicle and the mobile device at a time moment. A time moment refer to a moment in time. A time moment may include one or more points in time and/or one or more durations of time. The time moment at which coincidence determination is performed may occur after the passenger has completed a trip in the vehicle. For example, the time moment may occur subsequent to passage of a period of time after the passenger has completed the trip in the vehicle. As another example, the time moment may occur subsequent to movement of the vehicle after the passenger has completed the trip in the vehicle. For instance, the time moment may occur within one minute after the passenger has left the vehicle and/or after the vehicle has resumed movement after the passenger has left the vehicle.

For example, the coincident engine 114 may determine whether the locations (e.g., GPS location) of the mobile device and the vehicle are the same or within a threshold proximity to each other during the time moment to determine whether the location of the mobile device is coincident with the location of the vehicle. For instance, the coincident engine 114 may use GPS locations of the mobile device and the vehicle after the passenger has completed a trip in the vehicle to determine whether the passenger has left the mobile device in the vehicle. If the mobile device and the vehicle are co-located after (e.g., one minute after) the passenger has left the vehicle, the coincident engine 114 may determine that the mobile device has been left in the vehicle.

As another example, the coincident engine 114 may determine use the movements of the mobile device and the vehicle during the time moment to determine whether the location of the mobile device is coincident with the location of the vehicle. For instance, the coincident engine 114 may determine whether the mobile device and the vehicle are moving the same way (e.g., same linear direction, linear directions within a threshold linear direction amount, same angular direction, angular directions within a threshold angular direction amount, same linear speed, linear speeds within a threshold linear speed amount, same angular speed, angular speeds within a threshold angular speed amount, same linear acceleration, linear accelerations within a threshold linear acceleration amount, same angular acceleration, angular accelerations within a threshold angular acceleration amount) after the passenger has completed a trip in the vehicle to determine whether the passenger has left the mobile device in the vehicle. If the mobile device and the vehicle are moving in the same way after (e.g., one minute after) the passenger has left the vehicle, the coincident engine 114 may determine that the mobile device has been left in the vehicle. As another example, if the mobile device and the vehicle are moving in the same way for a certain time period during movement of the vehicle after the passenger has left the vehicle, the coincident engine 114 may determine that the mobile device has been left in the vehicle. The relative location of the mobile device to the vehicle remaining the same during the time moment may indicate that the mobile device has been left in the vehicle.

Determining whether the location of the mobile device is coincident with the location of the vehicle based on the relative location of the mobile device to the vehicle may include determination of whether the location of the mobile device is coincident with the location of the vehicle based signal strength of the signal received by the vehicle from the mobile device and/or the signal strength of the signal received by the mobile device from the vehicle at a time moment (one or more points in time and/or one or more durations of time after the passenger has completed a trip in the vehicle). For example, the coincident engine 114 may use the signal strength (e.g., magnitude of the signal strength) of the signal received by the vehicle from the mobile device and/or the signal strength of the signal received by the mobile device from the vehicle at the time moment to determine whether the locations of the mobile device and the vehicle are the same or within a threshold proximity to each other during the time moment, which may be used to determine whether the location of the mobile device is coincident with the location of the vehicle. For instance, the coincident engine 114 may use the signal strength of the signal(s) communicated between the mobile device and the vehicle after the passenger has completed a trip in the vehicle to determine whether the passenger has left the mobile device in the vehicle. If the signal strength of the signal(s) is higher than a threshold amount after (e.g., one minute after) the passenger has left the vehicle, the coincident engine 114 may determine that the mobile device has been left in the vehicle. As another example, if the strength of the signal(s) is of a certain amount (e.g., greater than zero) and steady for a certain time period (the relative location of the mobile device to the vehicle is the same) during movement of the vehicle after the passenger has left the vehicle, the coincident engine 114 may determine that the mobile device has been left in the vehicle.

Determining whether the location of the mobile device is coincident with the location of the vehicle based on the relative location of the mobile device to the vehicle may include determination of whether the location of the mobile device is coincident with the location of the vehicle based communicative coupling between the mobile device and the vehicle at a time moment (one or more points in time and/or one or more durations of time after the passenger has completed a trip in the vehicle). For example, the coincident engine 114 may use the status of the communicative coupling between the mobile device and the vehicle at the time moment to determine whether the locations of the mobile device and the vehicle are the same or within a threshold proximity to each other during the time moment, which may be used to determine whether the location of the mobile device is coincident with the location of the vehicle. For instance, the coincident engine 114 may use the determination of whether the mobile device and the vehicle are communicatively coupled after the passenger has completed a trip in the vehicle to determine whether the passenger has left the mobile device in the vehicle. If the mobile device and the vehicle are communicatively coupled after (e.g., one minute after) the passenger has left the vehicle, the coincident engine 114 may determine that the mobile device has been left in the vehicle. As another example, if the mobile device and the vehicle are communicatively coupled for a certain time period during movement of the vehicle after the passenger has left the vehicle, the coincident engine 114 may determine that the mobile device has been left in the vehicle.

In various embodiments, the alert engine 112 may be configured to generate one or more alerts responsive to a determination that the location of the mobile device is coincident with the location of the vehicle. An alert may include a notice that the mobile device is located in the vehicle. An alert may indicate that the mobile device of the passenger has been left in the vehicle (e.g., after completion of a trip by the passenger, after the passenger has left the vehicle). An alert may be generated for provision to one or more computing devices and/or one or more persons. For example, an alert generated by the alert engine 112 may include a message and/or may prompt a message to be generated. The message may include information indicating that the mobile device is located in the vehicle. The message may be provided to the driver of the vehicle and/or the passenger. For example, the driver may be provided with a message stating that a particular passenger has left a mobile device in the vehicle and/or the passenger may be provided with a message stating that a mobile device of the passenger has been left in the vehicle. The alert may generated by the alert engine 112 may include other message(s) and/or may prompt other message(s) to be generated. For example, a message including one or more instructions to the driver and/or the passenger may be generated for provision to the driver and/or the passenger. For instance, the message may include one or more instructions to the driver to locate mobile device left in the vehicle, to return the mobile device to the passenger, to bring the mobile device to a service for returning the mobile device to the passenger, and/or other instructions. The message may include one or more instructions to the passenger on how the passenger may retrieve the mobile device. The message may be provided to the passenger via a physical message (e.g., physical mail delivered to the address of the passenger) and/or a virtual message (e.g., electronic message delivered to electronic address of the passenger).

Figure 2:
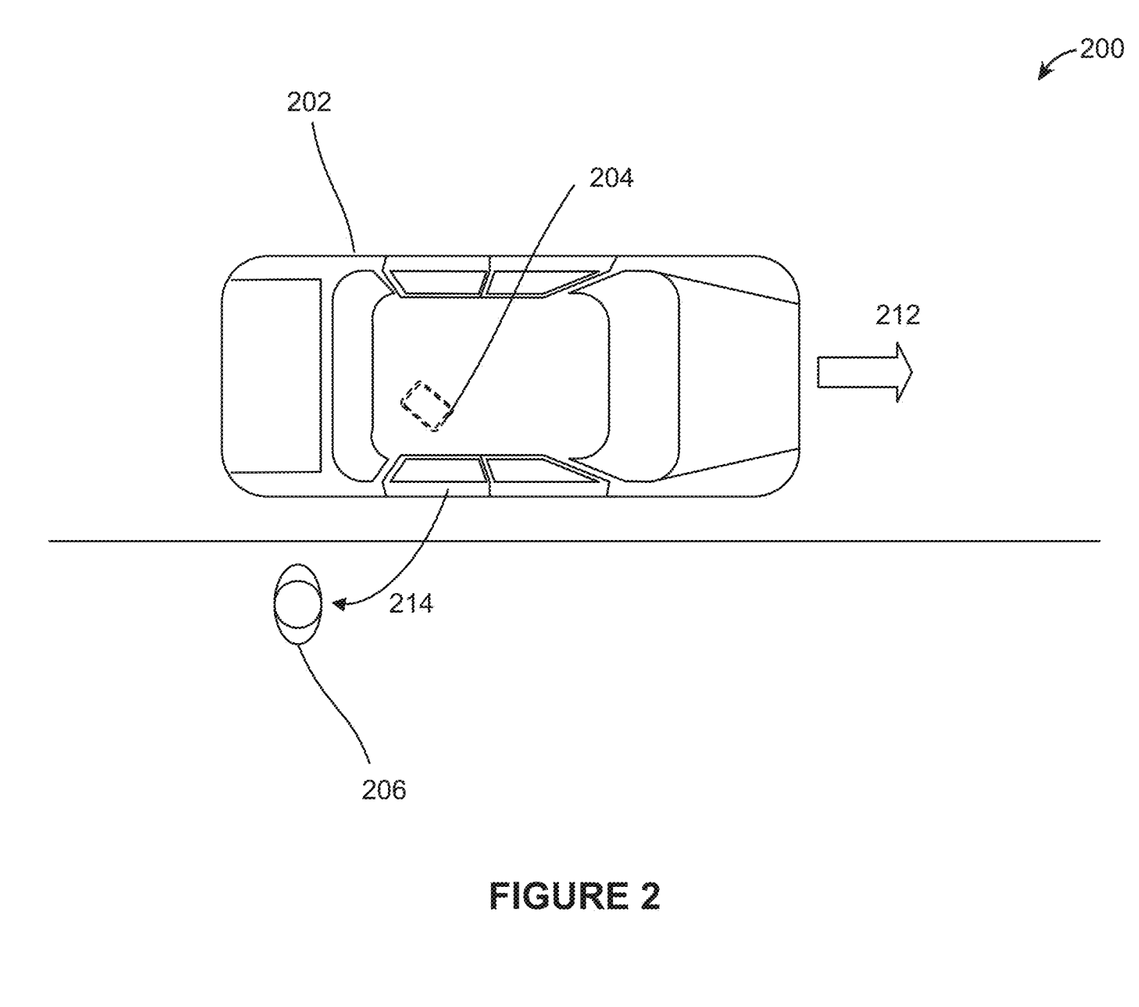
FIG. 2 illustrates an example environment for monitoring location of a mobile device, in accordance with various embodiments.

FIG. 2 illustrates an example environment 200 for monitoring location of a mobile device, in accordance with various embodiments. The environment 200 may include a vehicle 202, a mobile device 204, and a passenger 206. The passenger 206 may have completed a trip in the vehicle 202 and may have exited 214 the vehicle 202. The mobile device 204 of the passenger 206 may have been left in the vehicle 202. The vehicle 202 may move forward 212 after the passenger has completed the trip and exited 214 the vehicle 202.

While the vehicle 202 is moving forward 212, the location (e.g., GPS location) of the mobile device 204 and the location of the vehicle 202 may be provided to a computing device (e.g., a server, a computer of the vehicle 202). The computing device may compare the locations/movement (changes in locations) of the mobile device 204 and the vehicle 202 to determine whether the locations of the vehicle 202 and the mobile device 204 are coincident. Responsive to a determination that the location of the mobile device 204 is coincident with the location of the vehicle 202, an alert may be generated. The alert may indicate that the mobile device 204 has been left in the vehicle 202.

While the vehicle 202 is moving forward 212, the vehicle 202 and the mobile device 204 may communicate with each other. One or more signals (e.g., signal that the mobile device 204 is in the vehicle 204) may be received by the vehicle 202 from the mobile device 204 and/or received by the mobile device 204 from the vehicle 202. Whether the mobile device 204 has been left in the vehicle 202 (the locations of the vehicle 202 and the mobile device 204 are coincident) may be determined based on the strength of the signal(s) received by the vehicle 202 and/or the mobile device 204. If the mobile device 204 has been left in the vehicle 202, the strength of the signal may be of a certain amount and/or steady. If the mobile device 204 is taken by the passenger 206 out of the vehicle 202 (the locations of the vehicle 202 and the mobile device 204 are not coincident), the strength of the signal may be reduced to zero and/or otherwise reduced.

While the vehicle 202 is moving forward 212, the vehicle 202 and the mobile device 204 may communicate and/or check whether they are able to communicate with each other. Whether the mobile device 204 has been left in the vehicle 202 (the locations of the vehicle 202 and the mobile device 204 are coincident) may be determined based on the status of the communicative coupling between the mobile device 204. If the mobile device 204 has been left in the vehicle 202, the mobile device 204 and the vehicle 202 may be communicatively coupled (communicating with each other, capable of communicating with each other). If the mobile device 204 is taken by the passenger 206 out of the vehicle 202 (the locations of the vehicle 202 and the mobile device 204 are not coincident), the mobile device 204 and the vehicle 202 may not be communicatively coupled.

Figure 3:
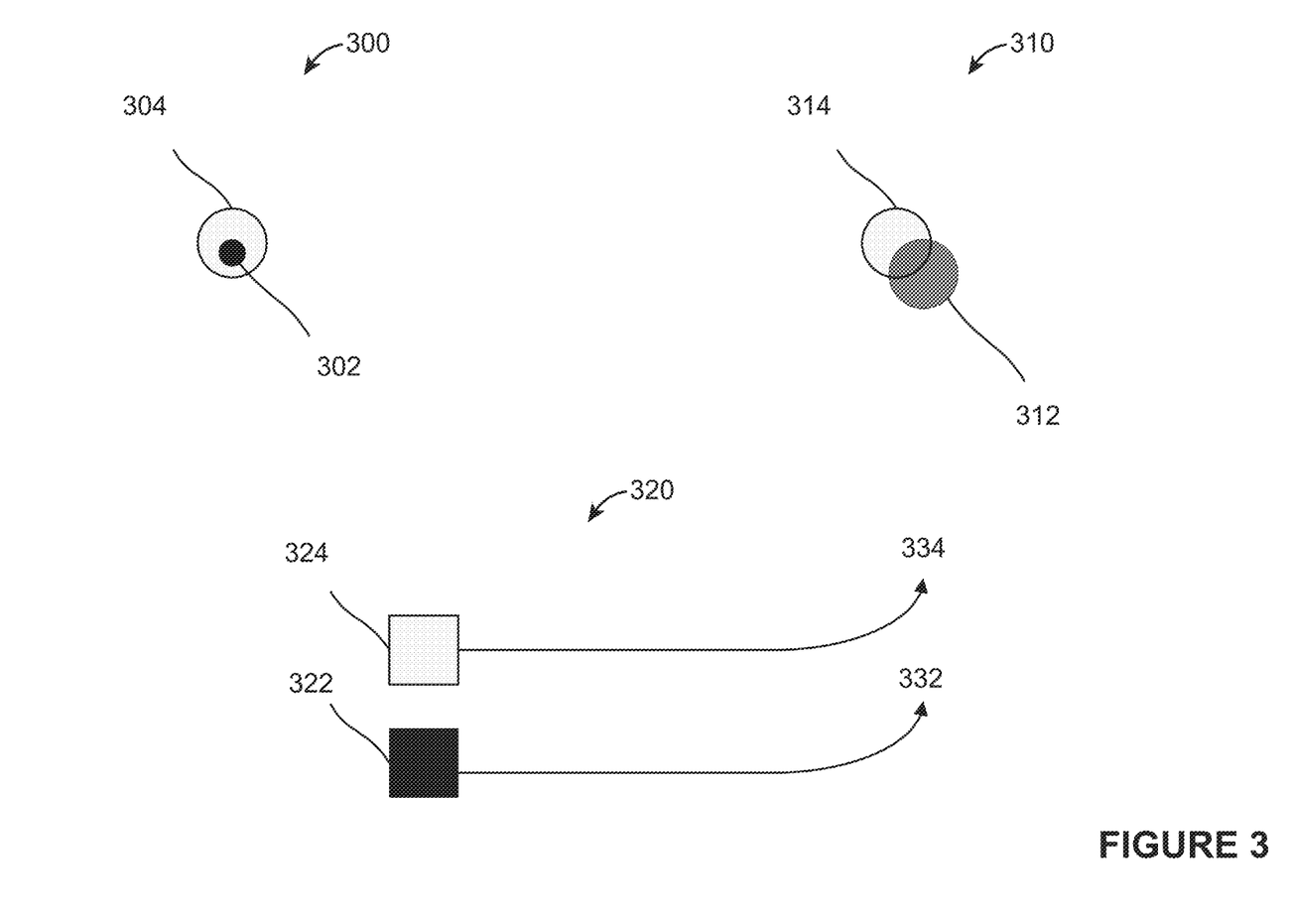
FIG. 3 illustrates example mobile device locations and vehicle locations in accordance with various embodiments.

FIG. 3 illustrates example mobile device locations and vehicle locations in accordance with various embodiments. In an example 300, a location of the mobile device may be indicated by a circle 302 and a location of the vehicle may be indicated by a circle 304. The circle 302 may represent a geographic area in which the mobile device is located (e.g., as determined based on a GPS sensor of the mobile device). The circle 304 may represent a geographic area in which the vehicle is located (e.g., as determined based on a GPS sensor of the vehicle). Based on the circle 302 being within the circle 304 (the location of the mobile device being within the location of the vehicle at a time moment), the location of the mobile device may be determined to be coincident with the location of the vehicle.

In an example 310, a location of the mobile device may be indicated by a circle 312 and a location of the vehicle may be indicated by a circle 314. The circle 312 may represent a geographic area in which the mobile device is located (e.g., as determined based on a GPS sensor of the mobile device). The circle 314 may represent a geographic area in which the vehicle is located (e.g., as determined based on a GPS sensor of the vehicle). Based on the circle 312 overlapping with the circle 312 (the location of the mobile device overlapping with the location of the vehicle at a time moment), the location of the mobile device may be determined to be coincident with the location of the vehicle.

In an example 320, a location of the mobile device may be indicated by a square 322 and a location of the vehicle may be indicated by a square 324. The square 322 may move over a path 332 during a time moment. That is, the mobile device may linearly and/or angularly move in the path 332 during the time moment. Similar, the square 324 may move over a path 334 during the time moment. That is, the vehicle may linearly and/or angularly move in the path 332 during the time moment. The movement 332 of the mobile device may match the movement 334 of the vehicle. Based on the matching movements 332, 334 of the mobile device and the vehicle, the location of the mobile device may be determined to be coincident with the location of the vehicle. That is, determining whether the location of the mobile device is coincident with the location of the vehicle may include determining whether movement of the mobile device at a time moment is coincident with movement of the vehicle at the time moment. The determination of whether the locations of the mobile device and the vehicle are coincident based on the movement of the mobile device and the vehicle may not need to consider the absolute location of the mobile device or the absolute location of the vehicle. For example, the fact that the mobile device and the vehicle have moved in the same way (e.g., no change in relative positions while mobile device or vehicle was moving) may be sufficient to determine that the locations of the mobile device and the vehicle are coincident.

Figure 4:
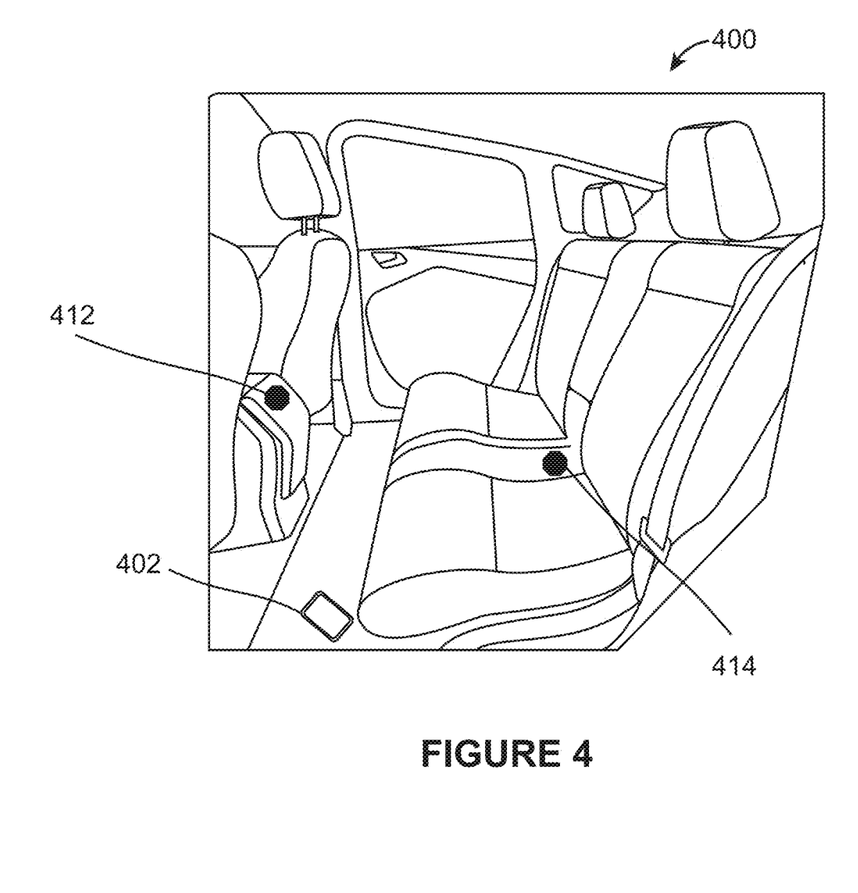
FIG. 4 illustrates an example environment for monitoring location of a mobile device, in accordance with various embodiments.

FIG. 4 illustrates an example environment 400 for monitoring location of a mobile device, in accordance with various embodiments. The environment 400 may include a cabin of a vehicle. A person (e.g., passenger, driver) may have left a mobile device 402 in the vehicle. The mobile device 402 may be located such that it is not readily visible (e.g., to the driver, to an image capture device within the vehicle). The vehicle may include one or more communication devices (e.g., transceivers, one or more transmitters, and/or one or more receivers) via which it may communicate with the mobile device 402. For example, the vehicle may include a communication device 412 and a communication device 414. The communication between the mobile device 402 and one or both of the communication devices 412, 414 may be used to determine that the mobile device 402 has been left in the vehicle. For example, the mobile device 402 may communicate one or more signals to the communication device(s) 412, 414 and/or the communication device(s) 412, 414 may communicate one or more signals to the mobile device 402. Based on the strength of the receive signal(s) (e.g., the signal strength being of or higher than a threshold amount), the mobile device 402 may be determined to be left in the vehicle. As another example, the communication device(s) 412, 414 may communicate or attempt to communicate with the mobile device 402. Based on the communication device(s) 412, 414 communicating with the mobile device 402 and/or being able to establish communication with the mobile device 402, the mobile device 402 may be determined to be left in the vehicle.

Figure 5:
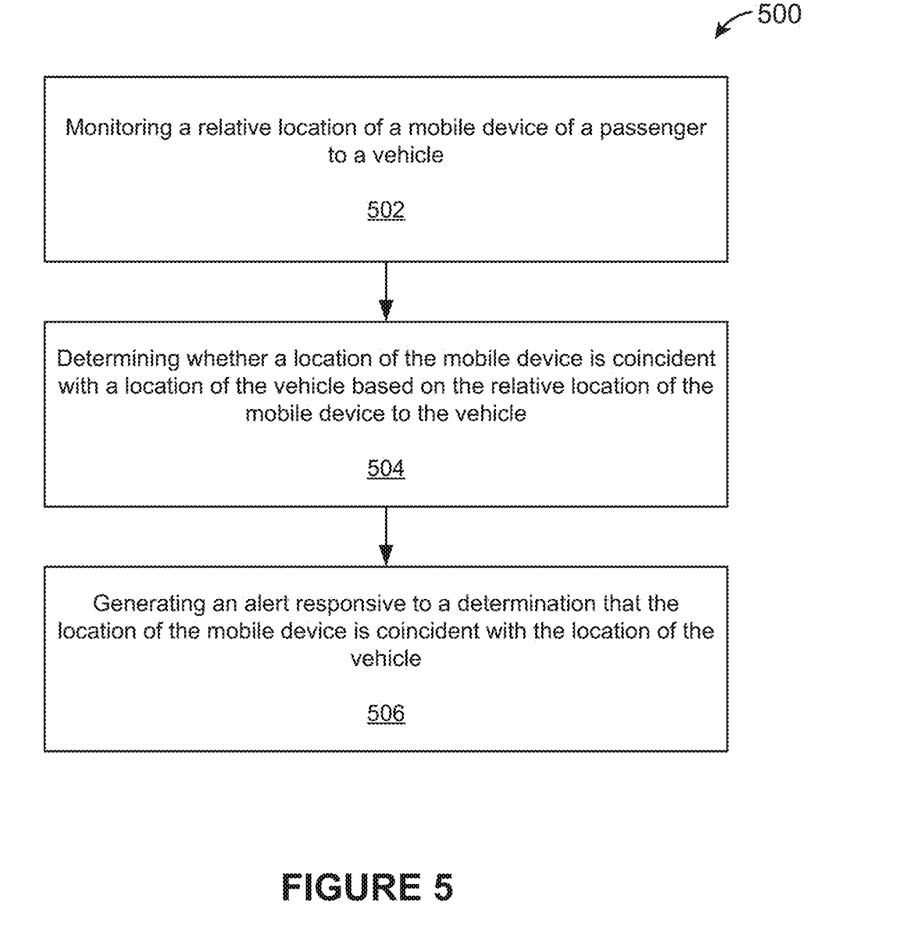
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a relative location of a mobile device of a passenger to a vehicle may be monitored. At block 504, whether a location of the mobile device is coincident with a location of the vehicle may be determined based on the relative location of the mobile device to the vehicle. At block 506, an alert may be generated responsive to a determination that the location of the mobile device is coincident with the location of the vehicle.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
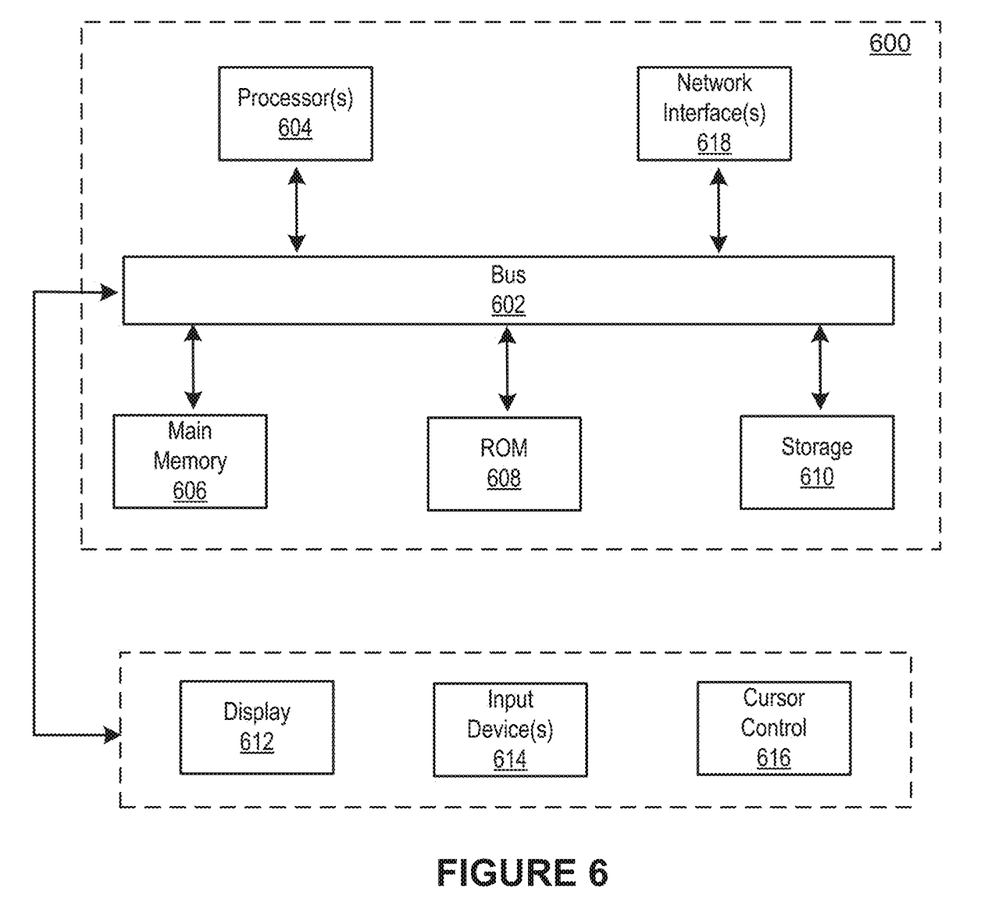
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform operations comprising:
monitoring a location of a mobile device of a passenger relative to a location of a vehicle;
determining that the location of the vehicle overlaps with the location of the mobile device at a moment after the passenger has completed a trip in the vehicle based on a magnitude and a steadiness of a signal strength received by the mobile device from the vehicle and a magnitude and a steadiness of a signal strength received by the vehicle from the mobile device;
determining that the passenger has left the vehicle based on an optical sensing of movement of the passenger out of the vehicle and a weight reduction from a total weight of the vehicle including the passenger;
determining, based on the location of the mobile device and the location of the vehicle, that the mobile device and the vehicle are moving with respective velocities within a threshold amount of each other and respective accelerations within a second threshold amount of each other after the passenger has left the vehicle; and
generating an alert indicating that the mobile device has been left in the vehicle.

2. The system of claim 1, wherein monitoring the location of the mobile device relative to the location of the vehicle comprises:
obtaining mobile device location information, the mobile device location information characterizing the location of the mobile device;
obtaining vehicle location information, the vehicle location information characterizing the location of the vehicle; and
determining the location of the mobile device relative to the location of the vehicle based on the mobile device location information and the vehicle location information.

3. The system of claim 2, wherein the mobile device location information is generated based on a location sensor of the mobile device and the location information is generated based on a location sensor of the vehicle.

4. The system of claim 1, wherein the moment occurs subsequent to passage of a period of time after the passenger has completed the trip in the vehicle.

5. The system of claim 1, wherein the moment occurs subsequent to movement of the vehicle after the passenger has completed the trip in the vehicle.

6. The system of claim 1, wherein the moment includes a point in time or a duration of time.

7. The system of claim 1, wherein the moment occurs within one minute after the passenger has left the vehicle or after the vehicle has resumed movement after the passenger has left the vehicle.

8. The system of claim 1, wherein determining that the passenger has left the vehicle further includes detecting an opening and closing of a door of the vehicle.

9. The system of claim 1, wherein determining that the location of the mobile device overlaps with the location of the vehicle includes determining that movement of the mobile device at a moment is coincident with movement of the vehicle at the moment.

10. The system of claim 1, wherein monitoring the location of the mobile device relative to the location of the vehicle comprises:
obtaining mobile device signal information, the mobile device signal information characterizing a first signal strength of a first signal received by the vehicle from the mobile device or a second signal strength of a second signal received by the mobile device from the vehicle; and
determining the location of the mobile device relative to the vehicle based on the first signal strength or the second signal strength.

11. The system of claim 1, wherein monitoring the location of the mobile device relative to the location of the vehicle comprises:

determining that the mobile device is communicatively coupled to the vehicle; and determining the location of the mobile device relative to the vehicle based on the communicative coupling between the mobile device and the vehicle.

12. The system of claim 1, wherein the alert includes information relating to the mobile device, and determining that the location of the vehicle overlaps with the location of the mobile device comprises determining that the vehicle occupies a same point as the device on a map.

13. The system of claim 12, wherein the information includes at least one of instructions to locate the mobile device left in the vehicle, instructions to return the mobile device to the passenger, or instructions to deliver the mobile device to a service for returning the mobile device to the passenger.

14. The system of claim 12, wherein the information includes instructions for the passenger to retrieve the mobile device.

15. The system of claim 1, wherein determining that the location of the vehicle overlaps with the location of the mobile device comprises determining that an angular acceleration of the mobile device is within a third threshold amount of an angular acceleration of the vehicle.

16. A method implemented by a computing system including one or more processors and storage media storing machine-readable instructions, wherein the method is performed using the one or more processors, the method comprising:

monitoring a location of a mobile device of a passenger relative to a location of a vehicle;

determining that the location of the vehicle overlaps with the location of the mobile device at a moment after the passenger has completed a trip in the vehicle based on a magnitude and a steadiness of a signal strength received by the mobile device from the vehicle and a magnitude and a steadiness of a signal strength received by the vehicle from the mobile device;

determining that the passenger has left the vehicle based on an optical sensing of movement of the passenger out of the vehicle and a weight reduction from a total weight of the vehicle including the passenger;

determining, based on the location of the mobile device and the location of the vehicle, that the mobile device and the vehicle are moving with respective velocities within a threshold amount of each other and respective accelerations within a second threshold amount of each other after the passenger has left the vehicle; and generating an alert indicating that the mobile device has been left in the vehicle.

17. The method of claim 16, wherein determining that the location of the mobile device overlaps with the location of the vehicle includes determining that movement of the mobile device at a moment is coincident with movement of the vehicle at the moment.

18. The method of claim 16, wherein monitoring the relative location of the mobile device to the vehicle comprises:

obtaining mobile device signal information, the mobile device signal information characterizing first signal strength of a first signal received by the vehicle from the mobile device or second signal strength of a second signal received by the mobile device from the vehicle; and determining the location of the mobile device relative to the vehicle based on the first signal strength or the second signal strength.

19. The method of claim 16, wherein monitoring the relative location of the mobile device to the vehicle comprises:

determining that the mobile device is communicatively coupled to the vehicle; and determining the location of the mobile device relative to the vehicle based on the communicative coupling between the mobile device and the vehicle.

20. A non-transitory computer readable medium comprising instructions that, when executed, cause one or more processors to perform:

monitoring a location of a mobile device of a passenger relative to a location of a vehicle;

determining that the location of the vehicle overlaps with the location of the mobile device at a moment after the passenger has completed a trip in the vehicle based on a magnitude and a steadiness of a signal strength received by the mobile device from the vehicle and a magnitude and a steadiness of a signal strength received by the vehicle from the mobile device;

determining that the passenger has left the vehicle based on an optical sensing of movement of the passenger out of the vehicle and a weight reduction from a total weight of the vehicle including the passenger;

determining, based on the location of the mobile device and the location of the vehicle, that the mobile device and the vehicle are moving with respective velocities within a threshold amount of each other and respective accelerations within a second threshold amount of each other after the passenger has left the vehicle; and generating an alert indicating that the mobile device has been left in the vehicle.

* * * * *